United States Patent Office 3,544,566
Patented Dec. 1, 1970

3,544,566
PROCESS FOR PRODUCING ARENO-OXAZINONES
Heimo Brunetti, Reinach, Basel-Land, Switzerland, assignor to Geigy Chemical Corporation, Ardsley, N.Y., a corporation of New York
No Drawing. Filed Feb. 16, 1968, Ser. No. 705,928
Claims priority, application Switzerland, Feb. 27, 1967, 2,902/67
Int. Cl. C07d 87/20
U.S. Cl. 260—244                                      7 Claims

ABSTRACT OF THE DISCLOSURE

Areno-oxazinones are produced from aromatic carbocyclic or heterocyclic carboxylic acid chlorides or bromides and o-hydroxy-aryl-carboxylic acid amides at a temperature in the range of from 60 to 230° C. and preferably between 100 and 200° C., optionally with a reaction accelerator and/or an aprotic organic solvent; hydrogen halide and water which are set free during the reaction being continuously eliminated. The resulting areno-oxazinones are valuable intermediates in the production of s-triazine light stabilizers for polymeric synthetic materials.

DETAILED DISCLOSURE

This invention relates to a novel process for the production of areno-oxazinone compounds.

Certain areno-oxazinone compounds, of the formula

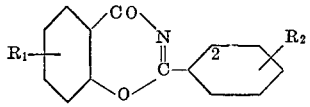

wherein $R_1$ and $R_2$ represent hydrogen or conventional substituents, but $R_2$ represents, in particular, hydroxy in 2-position, are known as valuable intermediate products for the production of s-triazine stabilizers for polymeric synthetic materials due to their absorptivity for certain ranges of ultraviolet light. These known intermediates were hitherto produced by a two-step process wherein a salicylic acid amide is acylated with an aromatic carboxylic acid chloride in pyridine as basic reaction medium and the corresponding O- or N- acyl salicylic acid amides are obtained, whereupon the latter intermediate acylated amides are converted with ring closure in an acid organic reaction medium, especially in xylene or anisol, and introduction of chloride, to the corresponding benzoxazinone compounds, with conventional purification of the acylated amide intermediates and the benzoxazinone end products.

More in particular, A. Mustafa et al. describe in J.A.C.S. 79 (1957), page 3846 the above described process using starting materials which lead to benzoxazinones of the above formula wherein $R_1$ represents hydrogen and $R_2$ represents methyl or methoxy in 4-position, with yield rates of about 61% of benzoxazinone calculated on the starting salicylic acid amide.

It is an object of the invention to provide a process which affords the aforesaid benzoxazinones and related products by way of fewer production stages and with higher yield rates than are obtained when carrying out the above-described known process with suitably substituted starting materials.

This object is attained by the invention which provides a process for producing areno-oxazinones, in a single stage and without the use of acid binding agent and hydrogen chloride, which process comprises heating a mixture of (a) a compound of the formula

R—CO—X    (II)

wherein X represents chlorine or bromine and R represents the radical of a carbocyclic aromatic or of a heterocyclic aromatic ring system having from one to three five- or six-membered rings, which system contains at least one ring free from nitrogen atoms as ring members and a carbon ring member of which is linked to the CO group in the above formula, and (b) an o-hydroxy-aryl-carboxylic acid amide of the formula

wherein A represents the divalent radical of a carbocyclic aromatic ring system having from one to at most three six-membered rings, at a temperature in the range of from 60 to 230° C. and continuously removing from the mixture hydrogen halide and water being cleaved off during the ensuing reaction, thereby obtaining as condensation product a compound of the formula

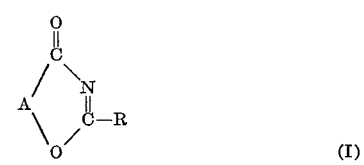

wherein A and R have the aforesaid meanings, any other substituents of any rings of A and R being substituents which remain unchanged under the above reaction conditions. Preferably the reaction is carried out at about 100° to 200° C. In this process, no isolation and purification of intermediate products is required and, in addition, the end products of Formula I are obtained in unexpectedly higher yields and in greater purity than with the conventional process.

R in Formula I primarily represents the radical of a mononuclear ring system, or otherwise, a condensed di- or tri-nuclear ring system. Phenyl, naphthyl, furyl or thienyl radicals are particularly preferred.

A in Formula I preferably represents the radical of a mononuclear ring system or a di- or tri- nuclear condensed ring system. Phenylene or naphthylene radicals are particularly preferred.

As substituents which remain unchanged under the reaction conditions, the radicals A and R can contain, e.g. halogens up to the atomic number 35 such as fluorine, chlorine or bromine, or optionally substituted alkyl, cycloalkyl or aryl groups, alkylated or acylated hydroxyl or amino groups, free or esterified carboxyl groups, sulphonic acid ester groups and also carboxylic acid amide or sulphonic acid amide groups optionally substituted at the nitrogen atom.

Non-ionogenic substituents of the radical R are preferably not in the o-position to the bond to the oxazine ring.

As substituents of A or R, alkyl groups can be straight or branch chained and have 1 to 18, preferably 1 to 10 carbon atoms. They are thus, e.g. the methyl, ethyl, isopropyl, tert. octyl or decyl group. The alkyl groups can be substituted, e.g. by aryl groups. Examples of such substituted alkyl groups are the benzylethyl or 1-phenylethyl group.

Cycloalkyl groups as substituents of A and R preferably contain 7 to 10 carbon atoms. Examples are the cyclohexyl and the methylcyclohexyl group.

Aryl groups as substituents of A or R are particularly those of the benzene series having 6 or more carbon atoms such as the phenyl, a methylphenyl, chlorophenyl or methoxyphenyl group.

If A or R contain alkylated hydroxyl or amino groups, then the alkyl radical thereof is, in particular, an optionally substituted alkyl or alkenyl group. The alkyl groups have 1 to 18, preferably 1 to 12 carbon atoms. Examples of usual substituents of the alkyl groups are halogens such as fluorine, chlorine or bromine, aryl groups, etherified hydroxyl groups, cyano groups as well as free or modified carboxyl groups. By modified carboxyl groups, principally carboxylic acid ester groups, also however, carboxylic acid amide groups, are to be understood; in the latter case carboxylic acid alkylamide groups, particularly those having a tertiary amide nitrogen atom, are preferred. Examples of further substituted alkyl groups are the 2-chloroethyl, or bromoethyl, benzyl, 1-phenylethyl, methylbenzyl, 2-methoxyethyl, 2-ethoxyethyl, 2-cyclohexyloxyethyl, 2-cyanoethyl, carboxymethyl, carbomethoxymethyl, carboethoxymethyl, carbodecyloxymethyl and the N,N-dimethylcarbamoylmethyl group.

Of the alkenyl groups, particularly $\Delta^2$-propenyl groups are preferred which can be substituted by low alkyl groups.

If A or R contain acylated hydroxyl or amino groups, then their acyl radical is derived, in particular, from an alphatic carboxylic acid having 1 to 18, preferably 1 to 10 carbon atoms; the carboxylic acid radical can be substituted, particularly by carboxyl, carbo-low alkoxy or low alkoxy groups. The acyl radical can also be derived from a cycloaliphatic carboxylic acid having 6 to 8 carbon atoms, from an aralphatic carboxylic acid having 8 to 10 carbon atoms or from an aromatic carboxylic acid; in the latter case, particularly from a carboxylic acid of the benzene series having 7 to 11 carbon atoms. It can also consist of a carbonic acid monoester radical having 2 to 11 carbon atoms. Examples are the acetyl, propionyl, stearoyl, acryloyl, β-carboxypropionyl, β-methoxy-, β-ethoxy- or β-hexyloxy-carbonylpropionyl, butoxyacetyl, β-methoxypropionyl, phenylacetyl, benzoyl, chlorobenzoyl, methylbenzoyl, methoxybenzoyl, butylbenzoyl, o-carboxybenzoyl, methoxycarbonyl, ethoxycarbonyl, butoxycarbonyl, decycloxycarbonyl, cyclohexyloxycarbonyl, benzyloxycarbonyl, phenoxycarbonyl, chlorophenoxycarbonyl or cresyloxycarbonyl group or the radical of crotonic acid, cyclohexane carboxylic acid or cinnamic acid.

Carboxylic and sulphonic acid ester groups as substituents of A and R are derived, e.g. from straight or branch chained, optionally substituted alkanols or alkenols. The alkanols preferably have 1 to 18 carbon atoms; examples are methanol, ethanol, isopropanol, pentanol, octanol, decanol or octadecanol. The alkanols can be substituted, e.g. by halogen such as fluorine, chlorine or bromine, aryl groups having 6 or more carbon atoms, alkoxy groups having 1 to 8 carbon atoms, or by cyano groups. Examples of such substituted alkanols are 2-fluoroethanol, 2-chloroethanol or 2-bromoethanol, 4-chlorobutanol, 2-methoxyethanol, 2-ethoxyethanol or 2-octoxyethanol, benzyl alcohol or 2-phenyl-ethanol. As alkenols, preferably those having 3 to 6 carbon atoms are used such as allyl or methallyl alcohol.

If A or R contain carboxylic or sulphonic acid amide groups then these can be substituted at the nitrogen by the same radicals which are derived from the alcohols mentioned above.

The radical R can also be substituted by nitro or hydroxyl groups; hydroxyl groups are preferably in the o-position of R.

To perform the process according to the invention, about 0.8 to 1.5, preferably about 1.1 equivalents of starting compound of Formula II are used per equivalent of starting compound of Formula III.

For the reaction, e.g. the amide of Formula III is used in the molten form and the acid chloride of Formula II is added, the water formed being removed by putting on vacuum of, e.g. 10–100 torr. Better yields are attained if the amide of Formula III is put into a boiling aprotic solvent and the acid chloride of Formula II is slowly added dropwise. If the acid chloride of Formula II is solid at room temperature then it is advantageously dissolved in the same aprotic solvent and the solution added dropwise. The water is azeotropically removed from the reaction mixture simultaneously with the aprotic solvent which acts as water entrainer.

Examples of aprotic solvents are optionally substituted aliphatic, cycloaliphatic or aromatic hydrocarbons as well as higher molecular ethers. Ligroin and heptane are mentioned as aliphatic hydrocarbons; cyclohexane as cycloaliphatic hydorcarbons. The aliphatic hydrocarbons can be substituted by halogen. Examples are carbon tetrachloride, tetrachloroethylene or 1,1,2-trichlorethane. Aromatic solvents which can be used as aprotic solvents are, e.g. benzene, toluene or o-, m- and p-xylene. Also aromatic halogenated hydrocarbons such as chlorobenzene and o-dichlorobenzene, aromatic nitrated hydrocarbons such as nitrobenzene, or aromatic ether hydrocarbons such as anisol, can be used. Also aromatic hydrocarbons the ring substituents of which are different from each other can be used as aprotic solvents, e.g. m-bromotoluene and p-chlorotoluene. In addition, aliphatic ethers having preferably at least 8 carbon atoms such as dibutyl- or ethyl hexyl ether, can also be used as aprotic solvents. The best results are obtained by the process according to the invention when solvents are used, the boiling points of which are in the range between 100 and 200° C.

Particularly good yields are obtained when from about 0.01 up to 0.2 mol of a seaction accelesator are added to the reaction mixture per mol of starting material of Formula III. Reaction accelerators are, particularly, tertiary nitrogen bases, e.g. open chain tertiary amines such as trimethylamine, trietrylamine, dimethyl aniline or diethyl aniline; cyclic tertiary amines such as triethylenediamine, N-alkylmorpholine, N-alkyl piperidine, N,N-dialkyl piperazine or quinuclidine; cyclic imines such as pyridine or qoinoline; as well as tertiary amides of low fatty acids such as dimethyl formamide or dimethyl acetamide. It is often of advantage to add reaction accelerators later during the course of the reaction.

The reaction is complete when no more water is distilled off. In general, the oxazinone of Formula I crystallises simply by cooling in practically pure form.

In some cases it is of advantage to remove the solvent in vacuo and dissolve impurities out of the residue with a strong polar solvent such as diethyl ether, acetone, methylethyl ketone, ethyl acetate, dioxane, tetrahydrofuran, methanol, ethanol, isopropanol, n-butanol, ethylene glycol monomethyl ether, chloroform, glacial acetic acid or dimethyl formamide.

The starting materials of Formulae II and III required are produced by generally known methods. Suitable starting materials of Formula II are, e.g. the chloride or bromide of benzoic acid, 4-chloro-, 2,4-dichloro-, 2-methyl-, 3,5-dimethyl-, 4-ethyl-, 3-cyclohexyl-, 4-benzyl-, 4-phenyl-, 2-hydroxy-, 4-hydroxy, 2,4-dimethoxy-, 4-octoxy-, 4-acetoxy-, 4-ethoxycarbonyloxy-, 4-diethylamino-, 3-acetylamino-, 4-methoxycarbonyl-, 3-N,N-dimethylsulphonamido benzoic acid, thiophene-3-carboxylic acid, furane-2-carboxylic acid, naphthalene-1-carboxylic acid, naphthalene-2-carboxylic acid or 1-methylnaphthalene-2-carboxylic acid.

Suitable starting materials of Formula III are, e.g. salicylamide, 2-hydroxy-5-chloro-, 2-hydroxy-3,5-dimethyl-, 2-hydroxy-3-tert. butyl-, 2-hydroxy-4-benzyl-, 2-hydroxy-5-chlorohexyl-, 2-hydroxy-5-phenyl-, 2-hydroxy-4-methoxy-, 2-hydroxy-5-ethoxy-, 2-hydroxy-4-acetoxy-, 2-hydroxy-4-ethoxycarbonyloxy-, 2 - hydroxy-4-dimethlamino-, 2-hydroxy-4-benzoylamino-, 2-hydroxy-4-ethoxycarbonyl-, 2-hydroxy-5-diethylaminocarbonyl-, 2-hydroxy-4-N,N-dimethylsulphonamido-benzamide or 2-hydroxy-3-naphthoic acid amide, 1-hydroxy-2-, 2-hydroxy-1-, 1-chloro-2-hydroxy-3- or 1-hydroxy-4-chloro-2 naphthoic acid amide.

The following non-limitative examples illustrate the invention further. The temperatures are given therein in degrees centigrade.

By the term "refluxing mixture" as used in these examples there is meant a liquid mixture which is being heated to the boil under reflux.

Example 1

77.5 g. of benzoyl chloride are added dropwise within 3 hours to a refluxing mixture of 68.5 g. of 2-hydroxybenzoic acid amide, 100 ml. of xylene and 5 ml. of pyridine and the water formed is removed by way of a water separator. After dropping in about half the acid chloride, another 5 ml. of pyridine are added. The mixture is then refluxed until the aqueous phase in the water separator no longer increases. The solvent is removed from the reaction mixture under water jet vacuum and 200 ml. of methanol are added to the residue. The residue and methanol are mixed and then filtered under suction. After drying in vacuo at 90°, 86 g. of 2-phenyl-4H-1,3-benzoxazinone-(4) are obtained, M.P. 97–99°. After recrystallising twice from ligroin, the compound melts at 102–103°. (Yield rate 77%).

From the aforesaid final product having a melting point of 102–103°, 2-(2'-hydroxyphenyl)-4-phenyl-6-cyclohexyl-s-triazine can be produced by the method described in Example 3 of Indian Pat. No. 91,875 sealed on Jan. 19, 1966.

Instead of the final product, the reaction mixture in the above Example as obtained after cleavage of water has been completed and before removal of solvent, which mixture consists essentially of the crude reaction product and solvent, can be used directly as starting material in the aforesaid Example 3 of Indian Pat. 91,875.

Example 2

38.8 g. of benzoyl chloride are added dropwise to 34.3 g. of 2-hydroxybenzoic acid amide, 2 ml. of pyridine and 200 ml. of ligroin at reflux temperature and the water formed is removed. When no more water separates off, the reaction mixture is worked up as described in Example 1. 42 g. of 2-phenyl-4H-1,3-benzoxazinone-(4) are obtained, M.P. 96–98°. (Yield rate: 75%).

If in the above example, instead of 200 ml of ligroin, one of the solvents given in the following table is used in the amount shown, then with otherwise the same procedure, the following yields of 2-phenyl-4H-1,3-benzoxazinone-(4) are obtained:

TABLE 1

| Solvent | ml. | Yield rates, percent | Yield in g. |
|---|---|---|---|
| Tetrachloroethylene | 200 | 76 | 42.5 |
| Dibutyl ether | 150 | 59 | 33.0 |
| Toluene | 300 | 78.5 | 44.0 |
| Chlorobenzene | 100 | 84 | 47.0 |
| o-dichlorobenzene | 100 | 86 | 48.0 |

Example 3

89.5 g. of 4-methoxybenzoyl chloride are added dropwise within 2½ hours to a refluxing mixture of 68.5 g. of 2-hydroxy-benzoic acid amide, 100 ml. of xylene and 5 ml. of pyridine and the water formed is removed by way of a water separator. After dropping in about half of the acid chloride, another 5 ml. of pyridine are added to the reaction mixture. This is then kept under reflux until the separated aqueous phase no longer increases. The reaction mixture is then cooled and is poured, while stirring, into 600 ml. of isopropanol whereupon 2-(4'-methoxyphenyl)-4H-1,3-benzoxazinone-(4) precipitates in the form of white crystals. These are filtered off under suction, washed with isopropanol and dried. In this way, 103 g. of the oxazinone compound are obtained, M.P. 170–173°. After recrystallising once from ethylene glycol monomethyl ether, the melting point rises to 175°. (Yield rate 81.5%).

If the reaction described above is performed without the addition of pyridine then, with otherwise the same procedure, 91.5 g. of 2-(4'-methoxyphenyl)-4H-1,3-benzoxazinone-(4) are obtained. (Yield rate 72.5%.)

Example 4

41.1 g. of 0-hydroxybenzamide are melted in a flask at a bath temperature of 160°. Vacuum of 90–100 torr is applied and, within 2 hours, 61.5 g. of p-methoxybenzoyl chloride are added to the melt. The mixture is then kept for 5 hours at 160°, the vacuum being increased to 12 torr. The melt is then poured into a mortar, after cooling it is pulverised and dissolved and allowed to crystallise from ethylene glycol monomethyl ether. 35.2 g. of impure 2-(4'-methoxyphenyl)-4H-1,3-benzoxazinone-(4) are obtained. After recrystallising twice from ethylene glycol monomethyl ether and once from ligroin, the compound melts at 173–174°. (Yield rate 41.5%.)

Example 5

13.7 g. of 2-hydroxybenzamide, 1 ml. of pyridine and 50 ml. of xylene are reacted as described in Example 1 with 19.2 g. of 4-chlorobenzoyl chloride. After all the water has been separated off, the reaction mixture is cooled, filtered under suction and the residue is recrystallised from ligroin. In this way, 18 g. of 2-(4'-chlorophenyl)-4H-1,3-benzoxazinone-(4) are obtained, M.P. 175–176°. (Yield rate 70%.)

Example 6

13.7 g. of 2-hydroxybenzamide, 0.5 ml. of pyridine and 50 ml. of chlorobenzene are reacted as described in Example 1 with 17.8 g. of 4-methylbenzoyl chloride and the product is worked up. 18.1 g. of 2-(4'-methylphenyl)-4H-1,3-benzoxazinone-(4) are obtained. After recrystallising twice from isopropanol it melts at 142°. (Yield rate 75%.)

Example 7

16.1 g. of 2-hydroxy-4-methoxybenzamide, 1 ml. of dimethyl formamide and 50 ml. of xylene are reacted as described in Example 1 with 19.2 g. of 4-chlorobenzoyl chloride and the product is worked up. In this way, 22.2 g. of 2-(4'-chlorophenyl)-7-methoxy-4H-1,3-benzoxazinone-(4) are obtained. Recrystallised from ethanol it then melts at 210–211°.

If in this example, instead of 2-hydroxy-4-methoxybenzamide, the equivalent amount of 2-hydroxy-4-ethoxybenzamide and the procedure given is followed, then 22.8 g. of 2-(4'-chlorophenyl)-7-ethoxy-4H-1,3-benzoxazinone-(4) are obtained which, after recrystallisation from chlorobenzene, melts at 189–190°. (Yield rate 76%.)

Example 8

16.1 g. of 2-hydroxy-4-methoxybenzamide, 1 ml. of pyridine and 50 ml. of xylene are reacted as described in Example 1 with 18.7 g. of 4-methoxybenzoyl chloride and the product is worked up. In this way, 19.5 g. of 2-(4'-methoxyphenyl)-7-methoxy-4H-benzoxazinone-(4) are obtained which, after recrystallising twice from methanol, melts at 183°. (Yield rate 69%.)

Example 9

13.7 g. of 2-hydroxybenzamide, 1 ml. of quinoline and 50 ml. of xylene are reacted as described in Example 1 with 17 g. of 3-methylbenzoyl chloride and the product is worked up. 17.5 g. of 2-(3'-methylphenyl)-4H-1,3-benzoxazinone-(4) are obtained which, after recrystallising twice from ligroin, melts at 136°.

If in this example, instead of 3-methylbenzoyl chloride, the equivalent amount of diphenyl-4-carboxylic acid chloride is used then, with otherwise the same procedure, instead of the benzoxazinone, 20 g. of 2-(4'-phenylphenyl)-4H-1,3-benzoxazinone-(4) are obtained which, after recrystallising twice from methylethyl ketone, melts at 164°. (Yield rate 67%.)

Example 10

137 g. of 2-hydroxybenzamide, 10 ml. of pyridine and 300 ml. of xylene are reacted as described in Example 1 with 230.5 g. of 2,4-dichlorobenzoyl chloride. On completion of the reaction, the reaction mixture is diluted, while still hot, with double the amount of toluene, cooled and filered under suction. In this way, 155 g. of 2-(2′,4′-dichlorophenyl)-4H-1,3-benzoxazinone-(4) are obtained which is recrystallised from ethylene glycol monomethyl ether and then melts at 163°. (Yield rate 53%.)

If in this example, instead of 2,4-dichlorobenzoyl chloride, the equivalent amount of 2-methyl- or 2-methoxybenzoyl chloride is used and otherwise the procedure given is followed then, instead of the benzoxazinone mentioned, 2-(2′-methylphenyl) - 4H - 1,3 - benzoxazinone-(4), M.P. 99–100°, or 2-(2′-methoxyphenyl) - 4H - 1,3-benzoxazinone-(4), M.P. 98–99° respectively is obtained but in less yield.

Example 11

75.5 g. of 2-hydroxy-3-methylbenzamide, 5 ml. of quinoline, 100 ml. of xylene and 89.5 g. of 4-methoxybenzoyl chloride are reacted and worked up as described in Example 1. In this way, 95 g. of 2(4′-methoxyphenyl)-8-methyl-4H-1,3 - benzoxazinone-(4) are obtained which, after recrystillisation from chlorobenzene, melts at 193–194°. (Yield rate 36%.)

If in this example, instead of 2-hydroxy-3-methylbenzamide, the equivalent amount of 2-hydroxy-3,5-dimethylbenzamide or of 2-hydroxy-5-methylbenzamide is used and otherwise the procedure given is followed, then instead of the benzoxazinone mentioned, 102 g. of 2-(4′-methoxyphenyl) - 6,8 - dimethyl - 4H - 1,3-benzoxazinone-(4), M.P. 230°, or 98 g. of 2-(4′-methoxyphenyl)-6-methyl-4H-1,3 - benzoxazinone-(4), M.P. 197°, are obtained. (Yield rates: 36% and 37%, respectively.)

Example 12

56 g. of 2-hydroxybenzamide, 4 ml. of pyridine and 80 ml. of xylene are reacted as described in Example 1 with 85.2 g. of 4-acetoxy-benzoyl chloride. On completion of the water separation, the xylene is removed from the reaction mixture under water-jet vacuum and acetone is poured over the residue. After standing for some time, 54 g. of 2-(4′-acetoxyphenyl)-4H-1,3-benzoxazinone-(4) precipitate. It is recrystallised from ethylene glycol monomethyl ether and ligroin and then melts at 152°. (Yield rate 48.5%.)

If in this example, instead of 4-acetoxy-benzoyl chloride, the equivalent amount of 4-ethoxycarbonyloxy benzoyl chloride is used and otherwise the procedure described is followed, then instead of the benzoxazinone mentioned, 67.5 g. of 2-(4′-ethoxy-carbonyloxy-phenyl) - 4H - 1,3-benzoxazinone - (4) are obtained. Recrystallised from ligroin it then melts at 148–149°. (Yield rate 54%.)

Example 13

68.5 g. of 2-hydroxybenzamide, 5 ml. of pyridine and 50 ml. of xylene are reacted as described in Example 1 with 102 g. of 4-nitrobenzoyl chloride which has been dissolved in 100 ml. of hot xylene. On completion of the water separation, the reaction mixture is filtered under suction while still warm and the residue is washed with toluene and dried. The 2-(4′-nitrophenyl)-4H-1,3-benzoxanione-(4) obtained weighs 119.5 g. and melts at 268°. (Yield rate 89.5%.)

Example 14

A solution of 26 g. 3-(N,N-dimethylsulphonamido)-benzoyl chloride in 60 ml. of xylene is added dropwise to 13.7 g. of 2-hydroxybenzamide and 30 ml. of xylene while refluxing and the water formed is removed. On completion of the dropwise addition, the whole is refluxed for 4 hours and then the solvent is removed under water-jet vacuum. The residue is mixed with methanol, the mixture is filtered under suction and the residue is dried. In this way, 19.1 g. of 2-(3′-N,N-dimethylsulphonamidophenyl)-4H-1,3-benzoxazinone-(4) are obtained. After recrystallising first from toluene, then from n-butanol and finally from dimethyl formamide, it then melts at 191–192°. (Yield rate 58%.)

Example 15

12.2 g. of 2-hydroxy-4-N,N-dimethylsulphonamidobenzamide, 2 ml. of pyridine and 50 ml. of xylene are reacted as described in Example 1 with 8.4 g. of 4-methoxybenzoyl chloride and the product is worked up. In this way, 14 g. of 2-(4′-methoxyphenyl)-7-N,N-dimethylsulphonamido-4H-1,3-benzoxazinone-(4) are obtained. After recrystallisation from methylethyl ketone and dimethyl formamide, it melts at 250°. (Yield rate 78%.)

If in this example, instead of 2-hydroxy-4-N,N-dimethylsulphonamidobenzamide, the equivalent amount of 2-hydroxy-5-chlorobenzamide or 2-hydroxy-5-cyclohexyl benzamide is used and otherwise the procedure given is followed then, instead of the benzoxazinone mentioned, 9.8 g., of 2-(4′-methoxyphenyl)-6-chloro-4H-1,3-benzoxazinone-(4) are obtained, (M.P. 223° after recrystallisation from dimethyl formamide), or 9 g. of 2-(4′-methoxyphenyl)-6-cyclohexyl-4H-1,3 - benzoxazinone-(4) are obtained (M.P. 150° after recrystallisation from hexane). (Respective yield rates: 68% and 54%.)

Example 16

45 g. of 2-hydroxy-5-methtylbenzamide, 2 ml. of pyridine and 200 ml. of xylene are reacted as described in Example 1 with 46 g. of benzoyl chloride and the product is worked up. In this way, 45.7 g. of 2-phenyl-6-methyl-4H-1,3-benzoxazinone-(4) are obtained, M.P. 118°. (Yield rate 64%.)

If in this example, instead of 2-hydroxy-5-methylbenzamide, the equivalent amount of 2-hydroxy-5-chlorobenzamide, 2-hydroxy-4,5-dimethyl benzamide, 2-hydroxy-4-methoxy benzamide or 2-hydroxy-4-chlorobenzamide is used and otherwise the procedure given is followed then, instead of 2-phenyl-6-methyl-4H-1,3-benzoxazinone-(4), the following benzoxazinones are obtained (the yield, melting point and solvent used for recrystallisation are given in each case in parenthesis):

2-phenyl-6-chloro-4H-1,3-benzoxazinone-(4), 50 g., 213°, methanol), (Yield rate 70%);
2-phenyl-6,7-dimethyl-4H-1,3-benzoxazinone-(4), (30 g., 163°, ethanol), (Yield rate 40%);
2-phenyl-7-methoxy-4H-1,3-benzoxazinone-(4), (36 g., 142°, glacial acetic acid), (Yield rate 47.5%);
2-phenyl-7-chloro-4H-1,3 - benzoxazinone-(4), (43 g., 190°, acetone). (Yield rate 56%.)

Example 17

27.4 g. of 2-hydroxybenzamide, 2 ml. of pyirine and 50 ml. of xylene are reacted as described in Example 1 with 27.4 g. of terephthalic acid monomethyl ester chloride and the product is worked up. In this way, 27 g. of 2-(4′-carbomethoxy-phenyl) - 4H-1,3-benzoxazinone-(4) are obtained. After repeated recrystallisation from o-dichlorobenzene and ligroin, it melts at 200–201°. (Yield rate 48%.)

Example 18

137 g. of 2-hydroxybenzamide, 10 ml. of pyridine and 200 ml. of xylene are reacted as described in Example 1 with 188 g. of 2-hydroxybenzoyl chloride, and the product is worked up. In this way, 215.5 g. of 2-(2′-hydroxyphenyl)-4H-1,3-benzoxazinone-(4) are obtained, M.P. 199–200°. (Yield rate 90%.)

If in this example, instead of 10 ml. of pyridine, the same amount of the reaction accelerators given in the following table, then 2-(2′-hydroxyphenyl)-4H-1,3-benzoxazinone-(4) is obtained in the following yields.

TABLE 2

| Reaction accelerator | Yield in g. | Yield rate, percent |
|---|---|---|
| Dimethyl aniline | 202 | 84.5 |
| Triethylamine | 198 | 83 |
| N-ethyl morpholine | 209 | 87.5 |
| Triethylenediamine | 208 | 87 |

Example 19

A mixture of 50 g. of 4-N,N-dimethylamino benzoyl chloride and 100 ml. of hot xylene is added all at once to 35.6 g. of 2-hydroxybenzamide, 2 ml. of pyridine and 200 ml. of xylene while refluxing. Boiling is continued until all water has been removed and then the solvent is removed under water-jet vacuum. Methanol is added to the oily residue and the yellow crystals which precipitate are filtered off under suction. In this way, 12 g. of 2-(4-N,N-dimethylamino-phenyl)-4H-1,3-benzoxazinone-(4), M.P. 220°, are obtained. After recrystallisation from chlorobenzene, and melting point is 225°. (Yield rate 17%.)

Example 20

34.3 of 2-hydroxybenzamide, 50 ml. of xylene and 2.5 ml. of pyridine are reacted as described in Example 1 with 37.5 g. of thiophene-2-carboxylic acid chloride and the product is worked up. In this way, 31.5 g. of 2-thiophenyl-(2')-4H-1,3 - benzoxazinone - (4) are obtained. After recrystallisation from ethylene glycol monomethyl ether, it melts at 161°. (Yield rate 78%.)

If in this example, instead of thiophene-2-carboxylic acid chloride, the equivalent amount of furane-2-carboxylic acid chloride is used and otherwise the procedure described is followed, then 2-furyl-(2')-4H-1,3-benzoxazinone-(4) can be isolated from the crude products, but in a slighter yield. After recrystallisation from hexane it melts at 115–116°.

Example 21

18.9 g. of 2-hydroxynaphthalene-3-carboxylic acid amide, 2 ml. of dimethyl formamide and 50 ml. of chlorobenzene are reacted as described in Example 1 with 18 g. of 4-methoxybenzoyl chloride and the product is worked up. In this way, 18 g. of 2-(4'-methoxyphenyl)-4H-1,3-naphtho-(3,2-e) - oxazinone-(4) are obtained. After recrystallising twice from dimethyl formamide, it melts at 245°. (Yield rate 60%.)

I claim:

1. A process for producing areno-oxazinones, comprising heating a mixture of
   (a) a compound of the formula $$R\text{–}CO\text{–}X \quad (II)$$

wherein
   X represent chlorine or bromine and
   R represents the radical of a carbocyclic aromatic or of a heterocylic aromatic ring system having from one to three five- or six-membered rings, which system contains at least one ring free from nitrogen atoms as ring members and a carbon ring member of which is linked to CO in the above formula,
   (b) an o-hydroxy-aryl-carboxylic acid amide of the formula

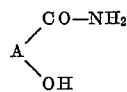

(III)

wherein
   A represents the divalent radical of a carbocyclic aromatic ring system having from one to at most three six-membered rings,
   at a temperature in the range of from 60 to 230° C., and continuously removing from the mixture hydrogen halide and water being cleaved off during the ensuing reaction,
   thereby obtaining as condensation product a compound of the formula

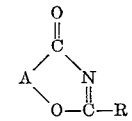

(I)

wherein
   A and R have the aforesaid meanings,
   any other substituents of any rings of A and R being substituents which remain unchanged under the above reaction conditions.

2. A process as described in claim 1, wherein heating is carried out at a temperature of from 100 to 200° C.

3. A process as described in claim 1, wherein R represents a phenyl radical, a naphthyl radical, a furyl radical or a thienyl radical, any substituent of which radicals is selected from halogen, alkyl, cycloalkyl, phenyl, alkoxy, alkylamino, alkoxycarbonyl, alkoxycarbonyloxy, alkanoyloxy, alkanoylamino, carbamoyl, alkyl-substituted carbamoyl, sulfamoyl, alkyl-substituted sulfamoyl, nitro and hydroxy.

4. A process as described in claim 1, wherein A represents a phenylene radical or a naphthylene radical, any substituent of which radicals is selected from halogen, alkyl, cycloalkyl, phenyl, alkoxy, alkylamino, alkoxycarbonyl, alkoxycarbonyloxy, alkanoyloxy, alkanoylamino, carbamoyl, alkyl-substituted carbamoyl, sulfamoyl and alkyl-substituted sulfamoyl.

5. A process as described in claim 1, further comprising adding to the said mixture prior or during the heating of the same, per mol of the compound of Formula III from about 0.01 mol up to about 0.2 mol of a basic tertiary amine, or a tertiary amide of a lower fatty acid, as reaction accelerator.

6. A process as described in claim 5, wherein said reaction accelerator is selected from trialkylamine, dialkylaniline, N - alkyl-morpholine, N - alkyl-piperidine, quinuclidine, pyridine, quinoline, dialkyl formamide and dialkylacetamide.

7. A process as described in claim 1, wherein said compounds of Formulas II and III are heated in an aprotic organic solvent capable of forming with water an azeotropic mixture at the boiling temperature of the latter, whereby cleaved-off water is removed from the reaction mixture.

References Cited

Horrom et al., J. Am. Chem. Soc. 72, 721–4 (1950).
Irie et al., Nippon Kagaku Zasshi 79, 1401–3 (1958).
Mustafa et al., J. Am. Chem. Soc. 79, 3846–9 (1957).

HENRY R. JILES, Primary Examiner

G. T. TODD, Assistant Examiner

U.S. Cl. X.R.

260—45.8, 544, 559